(12) United States Patent
Treleaven

(10) Patent No.: US 8,095,532 B2
(45) Date of Patent: Jan. 10, 2012

(54) APPARATUS AND METHOD FOR GENERATING REPORT DATA IN A MULTI-USER ENVIRONMENT

(75) Inventor: Ian Anthony Treleaven, Maple Ridge (CA)

(73) Assignee: SAP France S.A., Paris (FR)

( * ) Notice: Subject to any disclaimer, the term of this patent is extended or adjusted under 35 U.S.C. 154(b) by 453 days.

(21) Appl. No.: 12/060,064

(22) Filed: Mar. 31, 2008

(65) Prior Publication Data

US 2009/0248732 A1 Oct. 1, 2009

(51) Int. Cl.
*G06F 17/30* (2006.01)
(52) U.S. Cl. .......................................... 707/713; 707/758
(58) Field of Classification Search .................. 707/705, 707/736, 713, 758
See application file for complete search history.

(56) References Cited

U.S. PATENT DOCUMENTS 6,651,142 B1 * 11/2003 Gorelik et al. ................ 711/119

* cited by examiner

*Primary Examiner* — Hung Q Pham
(74) *Attorney, Agent, or Firm* — Mintz, Levin, Cohn, Ferris, Glovsky and Popeo, P.C.

(57) ABSTRACT

A computer readable storage medium includes executable instructions to receive a report request and perform a query operation corresponding to the report request to produce report results. The report results are then cached to produce cached report results. The computer readable storage medium further includes executable instructions to respond to the report request during a first interval utilizing the cached report results and respond to a second report request during the first interval utilizing the cached report results. One or more formatted reports are then generated based on the cached report results.

16 Claims, 5 Drawing Sheets

APPARATUS AND METHOD FOR GENERATING REPORT DATA IN A MULTI-USER ENVIRONMENT

FIELD OF THE INVENTION

The present invention relates generally to report processing. More particularly, the present invention relates to the processing of concurrent requests for report data in a multi-user environment.

BACKGROUND OF THE INVENTION

Business Intelligence generally refers to software tools used to improve business enterprise decision-making. These tools are commonly applied to financial, human resource, marketing, sales, customer, and supplier analyses. More specifically, these tools can include: reporting and analysis tools to present information; content delivery infrastructure systems for delivery and management of reports and analytics; data warehousing systems for cleansing and consolidating information from disparate sources; and, data management systems, such as relational databases or On Line Analytic Processing (OLAP) systems used to collect, store, and manage raw data.

There are a number of commercially available products to produce reports from stored data. For instance, Business Objects Americas of San Jose, Calif., an SAP company, sells a number of widely used report generation products, including Crystal Reports™, Business Objects Voyager™, Business Objects Web Intelligence™, and Business Objects Enterprise™. As used herein, the term report refers to information automatically retrieved (i.e., in response to computer executable instructions) from a data source (e.g., a database, a data warehouse, a plurality of reports, and the like, where the information is structured in accordance with a report schema that specifies the form in which the information should be presented. A non-report is an electronic document that is constructed without the automatic retrieval of information from a data source. Examples of non-report electronic documents include typical business application documents, such as a word processor document, a presentation document, and the like.

A report document specifies how to access data and format it. A report document where the content does not include external data, either saved within the report or accessed live, is a template document for a report rather than a report document. Unlike, other non-report documents that may optionally import external data within a document, a report document by design is primarily a medium for accessing and, formatting, transforming and or presenting external data.

A report is specifically designed to facilitate working with external data sources. In addition to information regarding external data source connection drivers, the report may specify advanced filtering of data, information for combining data from different external data sources, information for updating join structures and relationships in report data, and instructions including logic to support a more complex internal data model (that may include additional constraints, relationships, and (metadata).

In contrast to a spreadsheet type application, a report generation tool is generally not limited to a table structure but can support a range of structures, such as sections, cross-tables, synchronized tables, sub-reports, hybrid charts, and the like. A report design tool is designed primarily to support imported external data, whereas a spreadsheet application equally facilitates manually entered data and imported data. In both cases, a spreadsheet application applies a spatial logic that is based on the table cell layout within the spreadsheet in order to interpret data and perform calculations on the data. In contrast, a report design tool is not limited to logic that is based on the display of the data, but rather can interpret the data and perform calculations based on the original (or a redefined) data structure and meaning of the imported data. The report may also interpret the data and perform calculations based on pre-existing relationships between elements of imported data. Spreadsheets applications generally work within a looping calculation model, whereas a report generation tool may support a range of calculation models. Although there may be an overlap in the function of a spreadsheet document and a report document, the applications used to generate these documents contain instructions with express different assumptions concerning the existence of an external data source and different logical approaches to interpreting and manipulating imported data.

There are a number of problems associated with existing report generation techniques. For example, in many instances, reports are designed to have salient information as well as detailed information. Some users may wish to view a report in its entirety, while other users may wish to simply view the salient information included in the report. Further, in a multi-user environment, one or more users may wish to execute multiple database queries related to a single report at the same time. In such a scenario, a user attempting to view a report in its entirety may block users who only wish to view portions of a report. In some known report generation tools, a plurality of view requests may also block a user attempting to export an entire report. In these tools it is often the case that exporting an entire report is assumed to take longer than viewing portions of a report. Another prior art report generation problem is data proliferation. In order to service multiple users requesting concurrent access to database queries related to a report, temporary copies of the report file and the saved query data are typically generated so that the data between multiple users can be shared safely. That is, the sharing of results is performed by cloning temporary copies of the report file once it has been identified that there are multiple requesters requiring concurrent access to the report data. This means that entire copies of the report and the saved query data are required to service the concurrent requests, leading to high disk storage requirements.

It would be desirable to develop a technique for sharing reports and database query results among many users in a multi-user environment, so that multiple concurrent requests for report data may be serviced to multiple requestors efficiently and with reduced latency.

SUMMARY OF THE INVENTION

A computer readable storage medium includes executable instructions to receive a report request and perform a query operation corresponding to the report request to produce report results. The report results are then cached to produce cached report results. The computer readable storage medium further includes executable instructions to respond to the report request during a first interval utilizing the cached report results and respond to a second report request during the first interval utilizing the cached report results. One or more formatted reports are then generated based on the cached report results.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
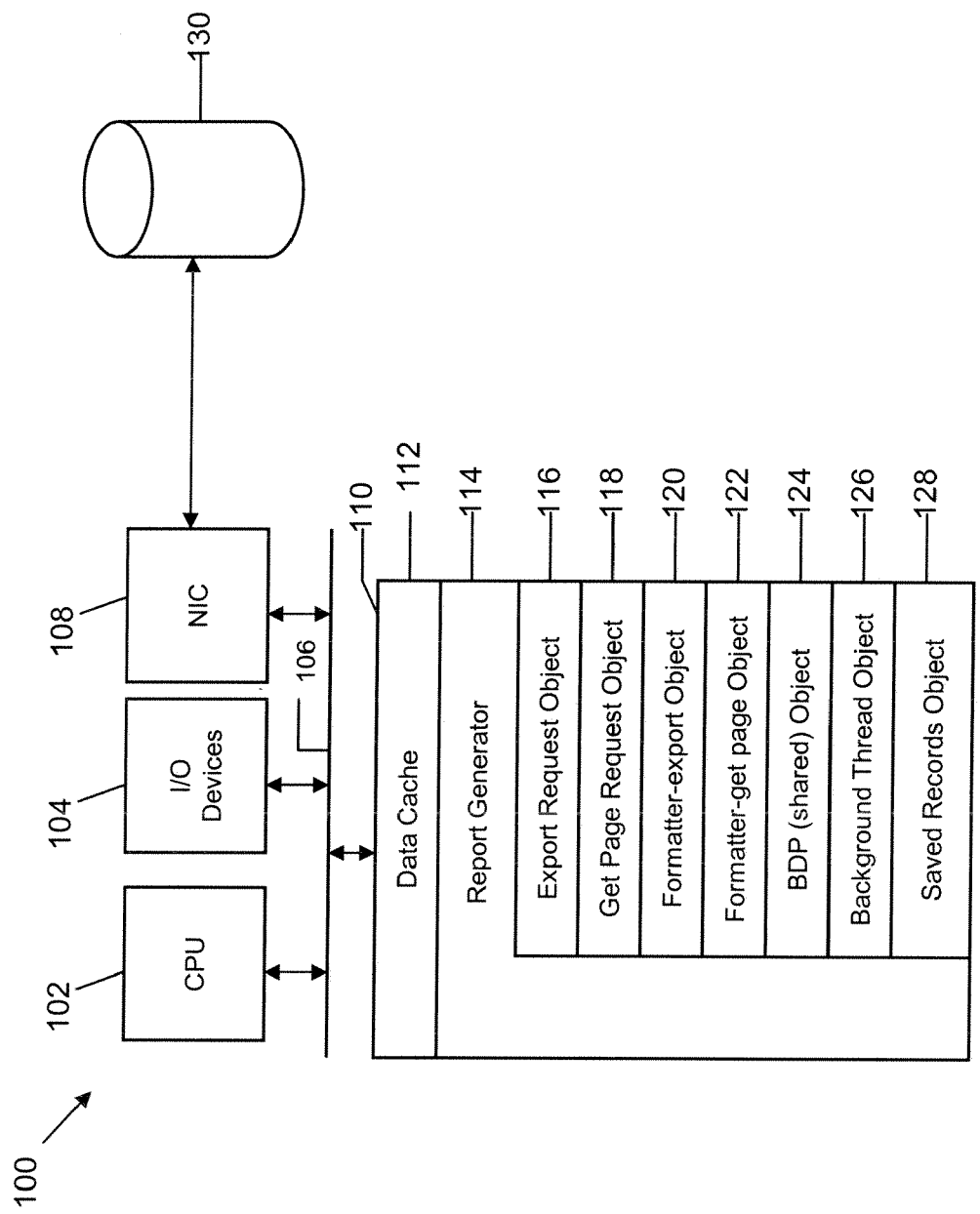
FIG. 1 illustrates a computer configured in accordance with one embodiment of the present invention.

FIG. 1 illustrates a computer configured in accordance with one embodiment of the present invention. The computer 100 includes standard components, including a Central Processing Unit (CPU) 102 and input/output devices 104, which are linked by a bus 106. A Network Interface Circuit (NIC) 108 provides connectivity to a network (not shown), thereby allowing the computer 100 to operate in a networked environment.

A memory 110 is also connected to the bus 106. In one embodiment, the memory 110 includes a Data Cache 112 and a Report Generator 114. The data cache 112 stores a set of records retrieved from a data source 130. The data source 130 may include sources of data that enable data storage and retrieval, such as, for example relational, transactional, hierarchical, multi-dimensional and object oriented databases. The data source 130 may also include tabular data (e.g. spreadsheets, delimited text files), data tagged with a markup language (e.g. XML data), transactional data, unstructured data (e.g., text files, screen scrapings) hierarchical data (e.g., data in a file system, XML data), files, a plurality of reports and any other data source accessible through an established protocol, such as, ODBC (Open Data Base Connectivity) and the like. The data source 130 may be a part of computer 100 or may be external to computer 100, as shown in FIG. 1.

The Report Generator 114 includes executable instructions to generate a set of reports and display the generated reports to one or more users. In one embodiment, the generated reports displayed to a user may include a portion of records in the report or an entire set of records in the report. For example, a portion of records may include information pertaining to a summary field, a detail field, a chart, a map, a bitmap, a crosstab, a text block, a group name, or a combination thereof, in the report. The set of generated reports may further be displayed on a computing device to a user. The computing device may include a computer such as 100, including conventional client computer components, or a portable computing device, including conventional portable computing device components, such as, Personal Digital Assistants (PDA's) and cellular phones.

The Report Generator 114 further includes one or more executable modules, such as an Export Request Object 116, a Get Page Request Object 118, a Formatter-export Object 120, a Formatter-get page Object 122, a Basic Data Processor (BDP) shared object 124, a Background Thread Object 126 and a Saved Records Object 128. The executable modules include one or more executable instructions to receive a report request, perform a query operation corresponding to the report request, produce report results, cache the report results, respond to report requests based on the cached results and generate one or more formatted reports based on the cached results. The operations performed by the executable modules are discussed in greater detail with respect to FIGS. 3-5.

It should be noted that the executable modules stored in memory 110 are exemplary. Additional modules, such as an operating system or graphical user interface module may also be included. It should be appreciated that the functions of the modules may be combined. In addition, the functions of the modules need not be performed on a single machine. Instead, the functions may be distributed across a network, if desired. Indeed, the invention is commonly implemented in a client-server environment with various components being implemented at the client-side and/or server-side. It is the functions of the invention that are significant not where they are performed or the specific manner in which they are performed.

Figure 2:
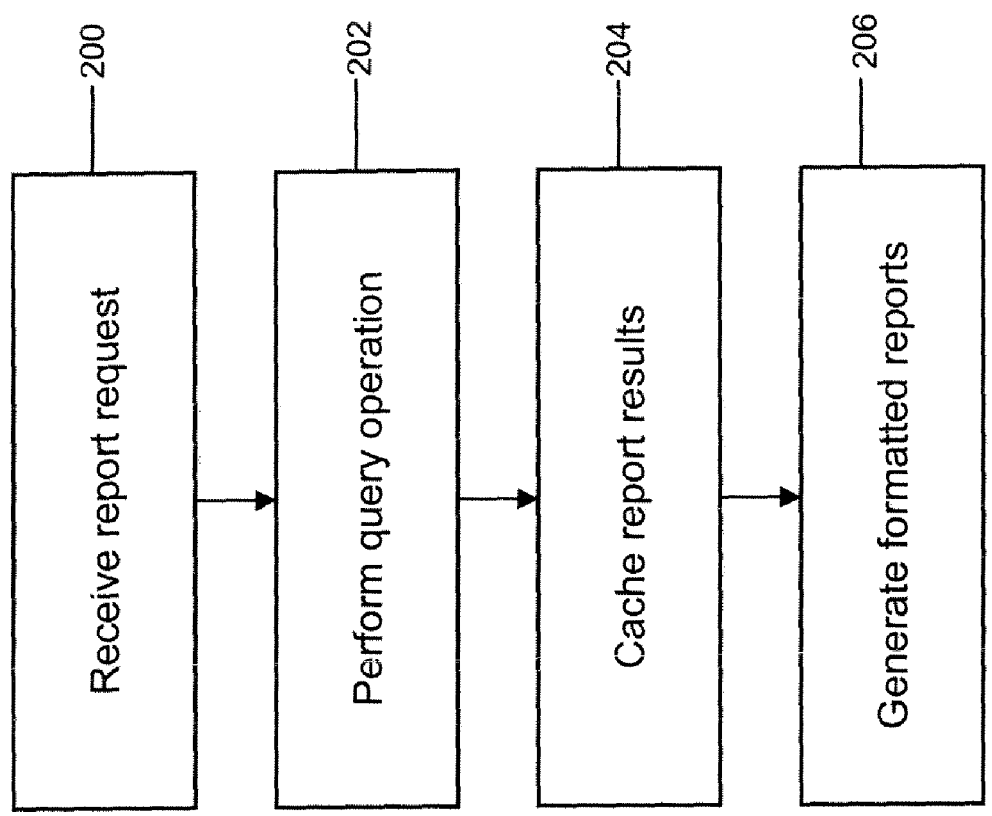
FIG. 2 is a flowchart illustrating report data processing in accordance with one embodiment of the present invention.

FIG. 2 is a flowchart illustrating exemplary operations for generating report data in accordance with one embodiment of the present invention. Initially, a report request is received 200. In one embodiment, the report request is of a type including, but is not limited to, an export report request, a print report request, and a view report request. A viewing request is generally performed on a report to view a subset of records in the report and therefore should be performed quickly. On the other hand, an export report request requires an entire set of records in a report and usually takes a longer time to process. In some cases, a view operation can also take as long as an export operation. A query operation corresponding to the report request is then performed to produce report results 202.

The report results are then cached to produce cached report results 204. This stands in contrast to prior art techniques of storing report results in files or as separate instances of reports. The cached report results are then utilized to respond to the report request during a first interval. A first set of cached report results is retrieved. The cached report results are then utilized to respond to a second request during the first interval. A second set of cached report results is retrieved. The first and second set of cached report results may correspond to a subset of records in a report or an entire set of records in a report. One or more formatted reports are then generated based on the cached report results 206. As will be discussed in greater detail with respect to FIGS. 3-5, the formatted reports may simultaneously be prepared and delivered to one or more users. Further, the operations of caching the report results 204 and generating the formatted reports 206 may be simultaneously executed. The formatted reports are then delivered to one or more users. In one embodiment, a first formatted report may be delivered to a user, while a second formatted report is completed. The formatted reports are then displayed to the users. The reports displayed to a user may include a subset of records in the report in one embodiment, or an entire set of records in the report, in another embodiment.

Figure 3:
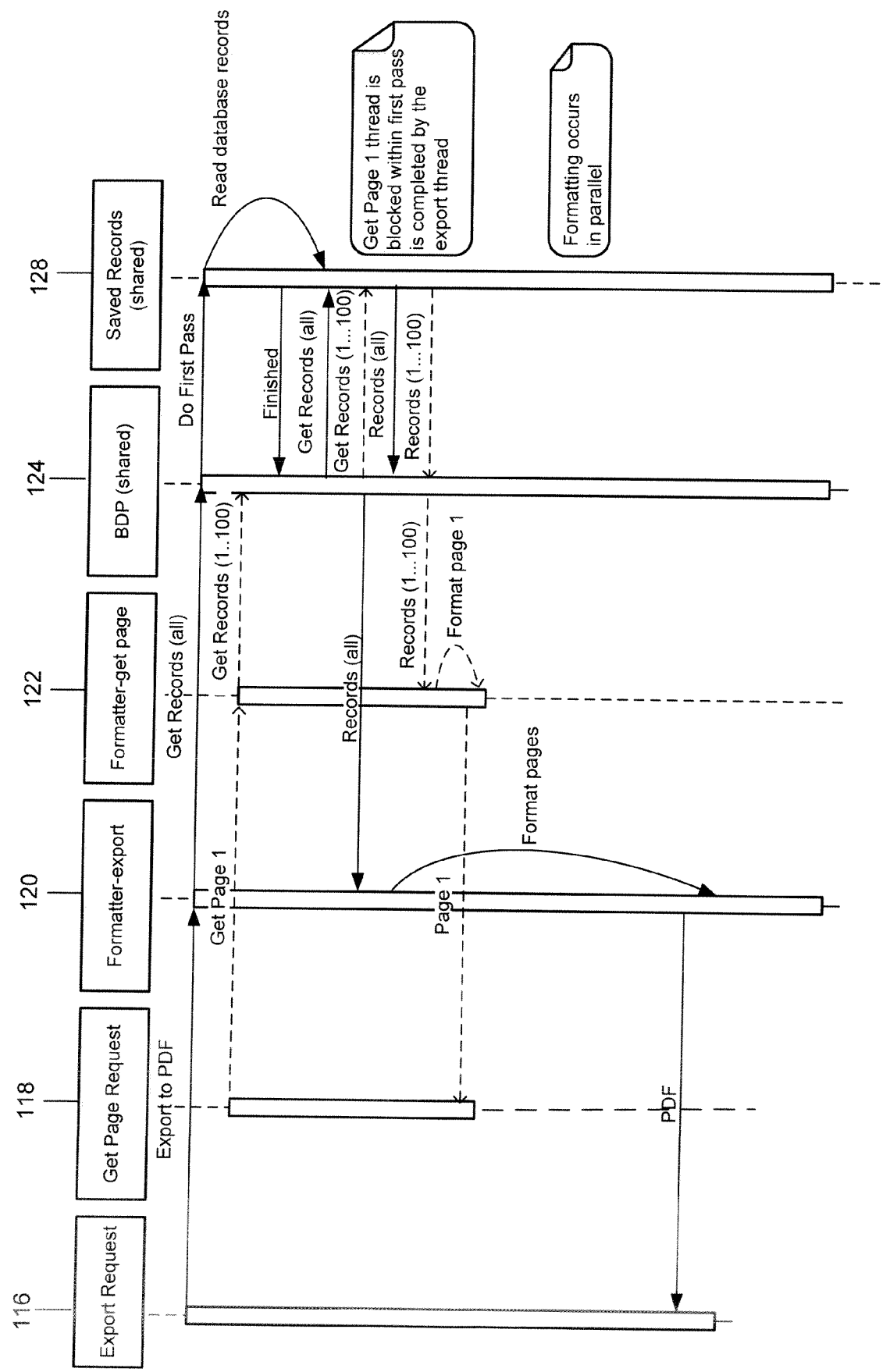
FIG. 3 illustrates an exemplary sequence of operations performed to service a viewing request related to a multi-pass report.
Figure 4:
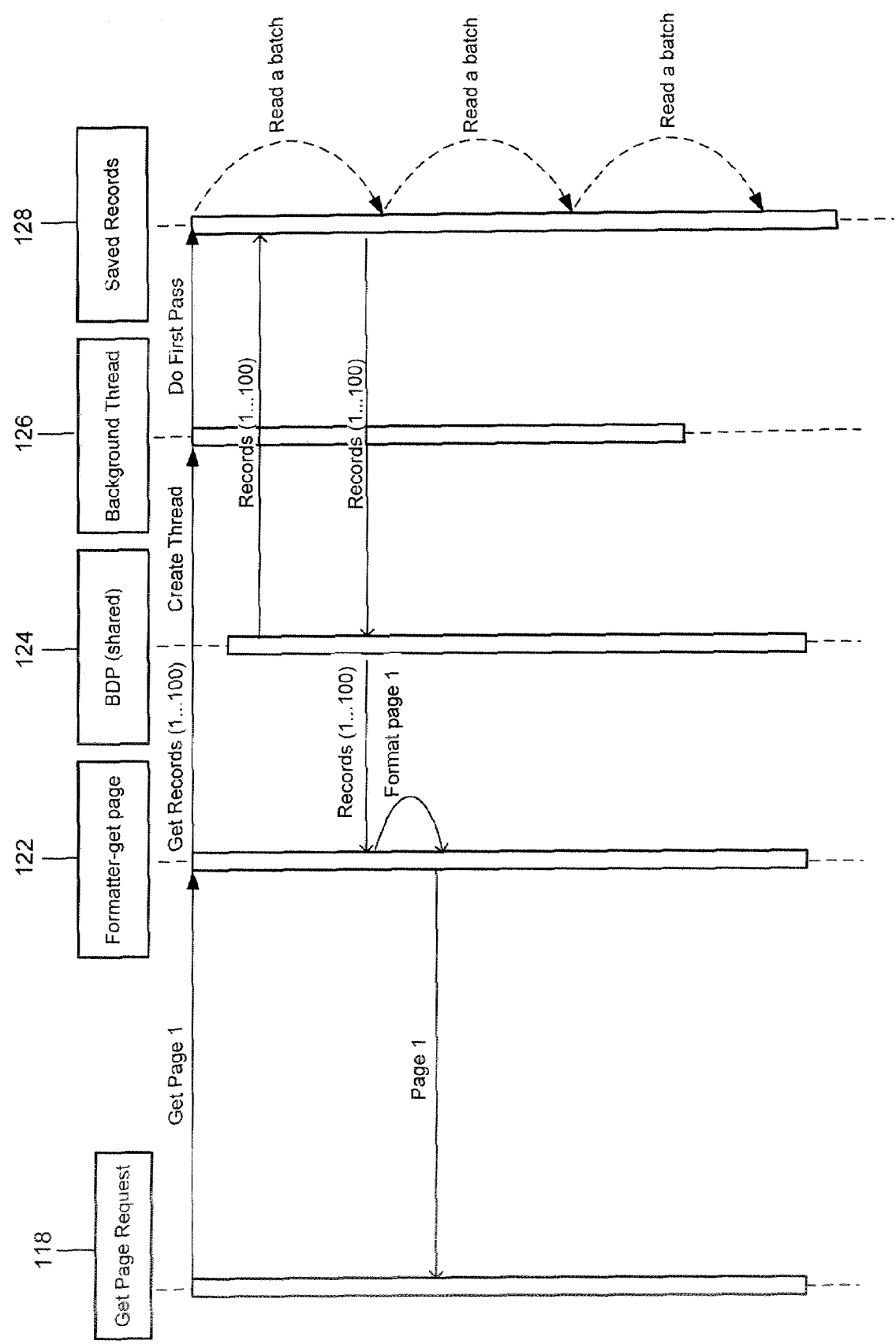
FIG. 4 illustrates an exemplary sequence of operations performed to service a viewing request related to a one-pass report.
Figure 5:
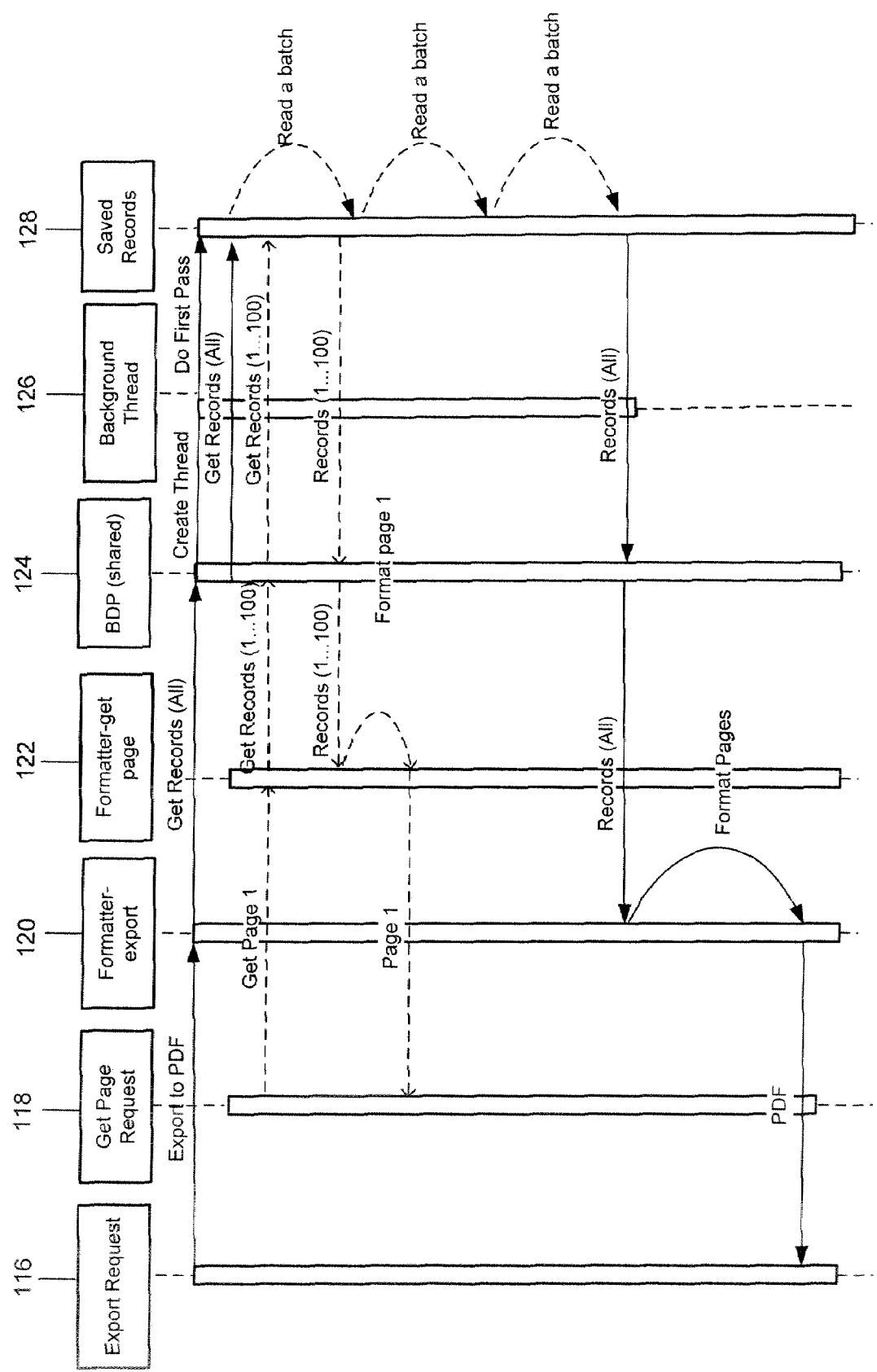
FIG. 5 illustrates an exemplary sequence of operations performed to service multiple viewing requests related to a one-pass report.

FIGS. 3-5 illustrate exemplary sequences of operations that are performed by the executable modules in the computer 100 shown in FIG. 1. In one embodiment, the sequence of operations corresponds to various interactions between the executable modules in the computer 100.

Referring now to FIG. 3, an exemplary sequence of operations is performed to service a viewing request related to a multi-pass report. A multi-pass report refers to a report that requires the execution of more than one pass over a query operation in order to generate a query result. As mentioned above a viewing request is generally performed on a report to view a subset of the records in the report, and can be performed relatively quickly. On the other hand, an export request requires an entire set of records in a report to be retrieved, and usually takes a relatively long time to retrieve and process. As illustrated in FIG. 3, an export report request for a report is initially received. In order to service the export report request, an Export Request object 116 initiates an "Export to PDF" operation to be performed by a Formatter-export object 120. The Formatter-export object 120 then initiates a "Get Records(all)" operation to be performed by a Basic Data Processor (BDP) object 124. The BDP object 124 invokes the saved records object 128, which accesses a data source and places report results in a cache.

A separate view report request for the report is received during the saved records object 128 processing. In order to service the view report request, a Get Page Request object 118 initiates a "Get Page 1" operation to be performed by the Formatter-get page object 122. The Formatter-get page object 122 then issues a "Get Records (1 . . . 100)" command to the BDP (shared) object 124.

As previously indicated, the Saved Records object 128 populates the data cache 112 with the set of records corresponding to the result of the execution of the export request to produce cached report results. When all the records are present in the data cache 112, the Saved Records object 128 issues a "Finished" command to the BDP shared object 124. The BDP (shared) object 124 then responds to the export report request during a first interval by utilizing the cached report results. Specifically, the BDP (shared) object 124 sends a "Get Records (all)" query request to the Saved Records (shared) object 128 to retrieve a first set of cached report results. The BDP (shared) object 124 then responds to a second request during the first interval by utilizing the cached report results. Specifically, the BDP (shared) object 124 sends a "Get Records (1 . . . 100)" command to the Saved Records (shared) object 128 to retrieve a second set of cached report results.

The Saved Records object 128 then sends the requested data to the BDP object 124. In particular, all of the report data is sent to the formatter-export object 120, as indicated by the "Records (all)" arrow between the BDP object 124 and the formatter-export object 120. A sub-set of records is sent from the BDP object 124 to the formatter-get page object 122. The Formatter-get page object 122 formats the first 100 records in the first page and returns the formatted report to the requester. Similarly, the Formatter Export object 120 simultaneously reads the entire set of records and formats a report with the entire set of records. The report is then returned to the requester.

Note that in the sequence of operations illustrated in FIG. 3, a request to view a portion of a report is serviced, while an export request on a report is in progress. In other words, a request to view a portion of a report (say, for example, the first 100 records) may be serviced, while still making progress on the export operation. In the illustrated example shown in FIG. 3 an export operation is shown taking a longer time to complete than a viewing operation. However, it is to be appreciated that the illustrated example shown in FIG. 3 is equally applicable in the case when a viewing operation takes longer to complete than an export operation.

Referring now to FIG. 4, an exemplary sequence of operations performed to service a viewing request related to a one-pass report is illustrated. The Get Page Request object 118 initiates a "Get Page 1" operation to be performed by the Formatter-get page object 122. The Formatter-get page object 122 then sends a "Get Records (1 . . . 100)" message to the BDP (shared) object 124. The BDP (shared) object 124 then sends a message to a Background Thread object 126 to read the first 100 records. The Background Thread object 126 passes a "Do First Pass" command to the Saved Records object 128. The Saved Records object 128 includes executable instructions to retrieve records from a data source. The records are stored in the data cache 112. While data is loaded into the cache, the "Get Records (1 . . . 100)" command is initiated by the BDP (shared) object 124. The command is serviced by the Background Thread object 126 and the Saved Records object 128 to retrieve the first 100 records from the cache. The BDP (shared) object 124 then passes the records to the Formatter-get page object 122. The Formatter-get page object 122 generates a report with the first 100 records and returns the formatted report to the requester. Note that in FIG. 4, several batches of records may be subsequently read from the data cache while the formatted view report is being generated and displayed to a user, thereby reducing the overall latency to service concurrent report viewing requests from multiple requesters.

FIG. 5 illustrates an exemplary sequence of operations to service multiple viewing requests related to a one-pass report. An export report request for a report is initially received. In order to service the export report request, an Export Request object 116 initiates an "Export to PDF" command to be processed by a Formatter-export object 120. The Formatter-export object 120 then initiates a "Get Records(all)" operation to be performed by a BDP (shared) object 124. The BDP (shared) object 124 creates a thread and then issues a Get Records (all) command to the Saved Records object 128.

A separate view report request for the report is then received. In order to service the view report request, a Get Page Request object 118 initiates a "Get Page 1" command to the Formatter-get page object 122. The Formatter-get page object 122 then issues a "Get Records (1 . . . 100)" command to the BDP (shared) object 124. The BDP (shared) object 124 then sends a Get Records (1 . . . 100) command to the Saved Records object 128. Once the first 100 records are ready, the Saved Records object 128 passes the records to the BDP (shared) object 124. The BDP (shared) object 124 then passes the records to the Formatter-get page object 122. The Formatter-get page object 122 generates and returns the first 100 records as Page 1.

When the entire set of records is retrieved, the Saved Records (shared) object 128 sends a message to the BDP (shared) object 124. The BDP (shared) object 124 receives the records and passes them to the Formatter-export object 120. The Formatter Export object 120 generates and returns a report with the entire set of records.

Note that several requests to view portions of a report may be serviced to multiple users, while an export request on a report is still in progress. The formatted view report and the formatted export report are prepared simultaneously. The formatted view report is delivered to a user while the formatting for the export report is still in progress. This reduces the overall latency. In addition, several batches of records may be subsequently read from the data cache while the formatted view reports are being generated and displayed to a user, thereby reducing the overall latency.

An embodiment of the present invention relates to a computer storage product with a computer readable medium having computer code thereon for performing various computer-implemented operations. The media and computer code may be those specially designed and constructed for the purposes of the present invention, or they may be of the kind well known and available to those having skill in the computer software arts. Examples of computer readable media include, but are not limited to: magnetic media such as hard disks, floppy disks, and magnetic tape, optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications they thereby enable others skilled in the art to best utilize the invention and various embodiments with various modifications as are suited to the particular use contemplated. It is intended that the following claims and their equivalents define the scope of the invention.

The invention claimed is:

1. A computer readable storage medium, comprising executable instructions executed by a process to:
   receive a first report request for a multi-pass report;
   perform a query operation corresponding to the first report request over a data store to produce report results, wherein the produced report results comprise an entire set of records of a report corresponding to the first report request;
   store the produced report results in a cache to produce cached report results;
   receive a second report request during the produced report results being stored,
   wherein the second report request is of a type different from a type of the first report request, and
   send a query request associated with the second report request to the cache;
   read a first batch of records from the cached report results corresponding to the query request;
   generate a first report from the read first batch of records, wherein the first report is formatted according to the type of the second report request; and
   send the generated first report and respond to the first report request using the cached report results to corresponding requesters during a time interval.

2. The computer readable storage medium of claim 1, further comprising executable instructions to:
   read a second batch of records from the cached report results;
   generate a second formatted reports from the second batch of records.

3. The computer readable storage medium of claim 2, further comprising executable instructions to simultaneously prepare the first formatted report and the second formatted report.

4. The computer readable medium of claim 3, wherein the first formatted report is sent while the second formatted report is completed.

5. The computer readable storage medium of claim 2, wherein the produced report results is stored while generating the first formatted report and the second formatted report.

6. The computer readable storage medium of claim 1, further comprising an export request object.

7. The computer readable storage medium of claim 1, further comprising a get page request object.

8. The computer readable storage medium of claim 1, further comprising a formatter-export object.

9. The computer readable storage medium of claim 1, further comprising a formatter-get page object.

10. The computer readable storage medium of claim 1, further comprising a basic data processor object.

11. The computer readable storage medium of claim 1, further comprising a background thread object.

12. The computer readable storage medium of claim 1, further comprising a saved records object.

13. The computer readable storage medium of claim 1, wherein the first report request comprises at least one of an export report request and a view report request.

14. The computer readable storage medium of claim 1, wherein the executable instructions to respond to the first report request during the first interval utilizing the cached report results further comprise executable instructions to retrieve a first set of cached report results.

15. The computer readable storage medium of claim 1, wherein the multi-pass report requires execution of more than one pass over the query operation to produce the query results.

16. A computer-implemented method comprising:
   receiving, by a computer system, a first report request for a multi-pass report;
   performing a query operation corresponding to the first report request over a data store to produce report results, wherein the produced report results comprise an entire set of records of a report corresponding to the first report request;
   storing the produced report results in a cache to produce cached report results;
   receiving a second report request during the produced report results being stored,
   wherein the second report request is of a type different from a type of the first report request, and
   sending a query request associated with the second report request to the cache;
   reading a first batch of records from the cached report results corresponding to the query request;
   generating a first report from the read first batch of records, wherein the first report is formatted according to the type of the second report request; and
   sending, by the computer system, the generated first report to corresponding requester and responding to the first report request using the cached report results during a time interval.

* * * * *